United States Patent [19]
Aoki

[11] Patent Number: 5,757,792
[45] Date of Patent: May 26, 1998

[54] MOBILE COMMUNICATION SYSTEM AND A METHOD OF COMMUNICATION MODE TRANSITION

[75] Inventor: Jinichi Aoki, Tokyo, Japan

[73] Assignee: NEC Corporation, Tokyo, Japan

[21] Appl. No.: 700,829

[22] Filed: Aug. 21, 1996

[30] Foreign Application Priority Data

Aug. 21, 1995 [JP] Japan ................................. 7-211603

[51] Int. Cl.$^6$ .................................................. H04J 3/22
[52] U.S. Cl. ......................... 370/347; 370/468; 370/524
[58] Field of Search .................................. 370/345, 347, 370/442, 465, 468, 522, 524, 914, 478; 455/552, 553, 422, 93, 142

[56] References Cited

U.S. PATENT DOCUMENTS

| | | | |
|---|---|---|---|
| 5,519,707 | 5/1996 | Takahashi | 370/524 |
| 5,598,412 | 1/1997 | Griffith et al. | 370/524 |
| 5,657,358 | 8/1997 | Panech et al. | 370/347 |

FOREIGN PATENT DOCUMENTS

63-45149  9/1988  Japan.

*Primary Examiner*—Douglas W. Olms
*Assistant Examiner*—Ricky Q. Ngo
*Attorney, Agent, or Firm*—Foley & Lardner

[57] ABSTRACT

A mobile communication system which enables any combinations of communication of speech signal and data signal to perform even during telephone communication is realized. In a mobile communication system provided with a base station control apparatus being connected to an ISDN switching unit, when data signal transmission is required while a mobile station being communicating with an ISDN terminal, a speech signal half-rate processing operation and a data signal transmission operation are commenced between the mobile station and the base station control apparatus. As for TDMA (Time Division Multiple Access) frames of signal between the mobile station and the base station, the full-rate (32 Kbps) speech signal is contained in all frames when only speech communication is performed, and each of the half-rare (16 Kbps) processed speech signal and the data signal is contained in every other frames alternatively when both of speech and data communication are performed simultaneously. At the ISDN terminal, speech signal is transferred through the B channel and data signal is transferred through the D channel.

5 Claims, 5 Drawing Sheets

FIG. 1(a)
PRIOR ART

| D | D | D | D | D | D | D | I |
|---|---|---|---|---|---|---|---|

D : DATA SIGNAL

FIG. 1(b)
PRIOR ART

| TIMESLOT 1) | V | V | V | V | V | V | W | 0 |
|---|---|---|---|---|---|---|---|---|
| 2) | V | V | V | V | V | V | V | I |
| 3) | V | V | V | V | V | V | V | I |
| 4) | V | V | V | V | V | V | V | I |
| 5) | V | V | V | V | V | V | V | I |

V : VOICE SIGNAL

FIG. 1(c)
PRIOR ART

| TIMESLOT 1) | V | V | V | V | D | D | I | 0 |
|---|---|---|---|---|---|---|---|---|
| 2) | V | V | V | V | D | D | D | I |
| 3) | V | V | V | V | D | D | I | 0 |
| 4) | V | V | V | V | D | D | D | I |
| 5) | V | V | V | V | D | D | I | 0 |

V : VOICE (ADPCM) SIGNAL
D : DATA SIGNAL

MOBILE COMMUNICATION SYSTEM AND A METHOD OF COMMUNICATION MODE TRANSITION

BACKGROUND OF THE INVENTION

1. Field of the Invention

The present invention relates to a mobile communication system and a method of communication mode transition, and more specifically, to a mobile communication system capable of performing a simultaneous communication of a speech (voice) signal and a data signal, and to a method of communication mode change from speech communication to simultaneous speech and data communication.

2. Description of the Related Art

In conventional mobile communication systems, a mobile station selects an information transfer mode prior to a commencement of a communication. Then, the mobile station sets the speech signal, a data signal, or a combination of the speech signal and the data signal into a time slot for signal transmission by a TDMA (Time Division Multiple Access) syaytem.

For instance, a technology of a simultaneous transmission system of the speech signal and the data signal is disclosed in Japanese Public Noticed Patent No. 63-45149.

Figure 1A:
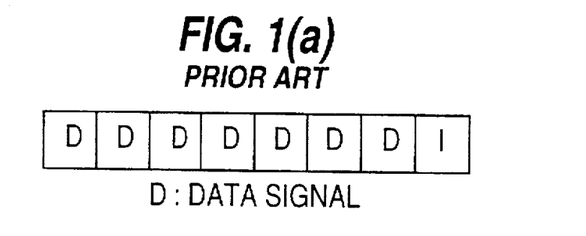
FIG. 1(a) is a bit format used when only the data signal is transmitted.
Figure 1B:
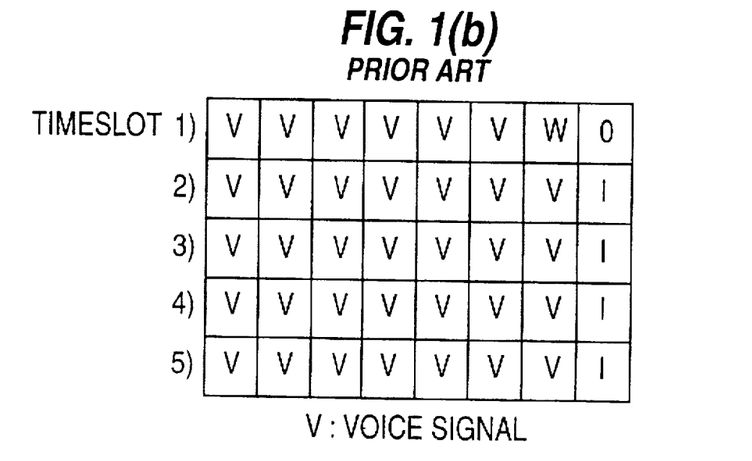
FIG. 1(b) is a bit format used when only the speech signal is transmitted.
Figure 1C:
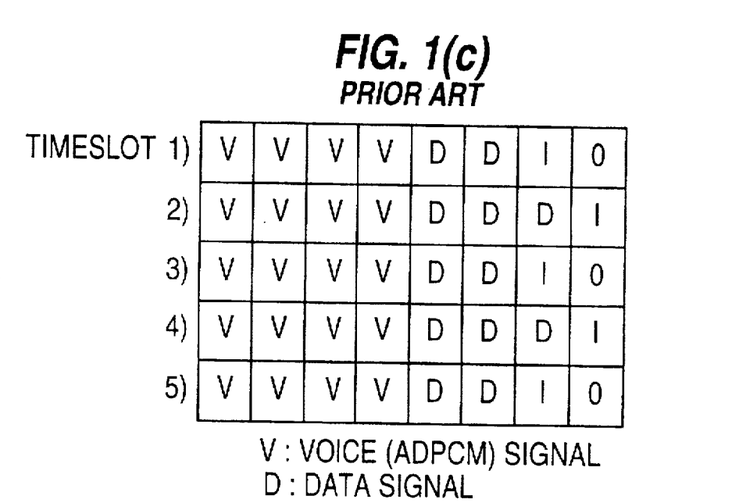
FIG. 1(c) is a bit format used when both of the speech signal and the data signal are transmitted simultaneously.

In this disclosure, seven bit positions among eight bits of a time slot are allocated for data signals to be transmitted as shown in a bit format of FIG. 1(a) when only the data signal is transmitted, a frame formed by five continuous time slots in which six or seven bit positions of each time slot are allocated for voice signals to be transmitted as shown in a bit format of Fig. 1(b) when only the voice signal is transmitted, and a frame formed by five continuous time slots in which four bit positions of each time slot are allocated for voice signals to be transmitted, whose sample is coded by way of the adaptive differential pulse code modulation (ADPCM), and among remaining four bits, two or three bit positions are allocated for data signal to be transmitted as shown in a bit format of FIG. 1(c) when both of voice signal and data signal are transmitted simultaneously.

In the above-explained conventional mobile communication system, before the mobile station starts the communication, namely before the mobile station executes the connection process of the communication channel, this mobile station selects the information transfer mode thereof. Thereafter, the mobile station designates the speech signal, the data signal, or the combination between the speech signal and the data signal. As a consequence, there is such a problem that the information transfer mode could not be changed once after the mobile station has entered into the communication condition, resulting in inconvenient communication operations.

Also, since the bits within a single time slot is subdivided into the small bits used as the speech signal and the data signal, the hardware used to simultaneously communicate the speech signal and the data signal would become complex. Thus, there is another problem that cost of this hardware would be increased.

SUMMARY OF THE INVENTION

An object of the present invention is to provide a mobile communication system capable of changing the communication mode into the simultaneous speech and data communication from the speech communication between a mobile station and an ISDN terminal, and to provide its method.

A mobile communication system, according to the present invention, is provided with a Time Division Multiple Access (TDMA) radio interface between mobile stations and a base station being coupled to a base station control apparatus, which is connected to an ISDN switching unit coupling a plurality of ISDN terminals.

The mobile communication system comprises a full rate speech coding unit being provided in the mobile station and the base station control apparatus respectively for coding speech signal with full bit rate as being used for ordinary communication speed, a half rate speech coding unit being provided in the mobile station and the base station control apparatus respectively for coding speech signal with half bit rate as being used for ordinary communication speed, and frame allocating control means being provided in the mobile station and the base station control apparatus respectively for allocating all TDMA frames to speech signal being coded with full bit rate when communication between the mobile station and the ISDN terminal being speech communication only, and for allocating each of TDMA frames to a speech signal being coded with half bit rate and a data signal having the same bit rate as the speech signal alternatively when communication between the mobile station and the ISDN terminal being simultaneous speech communication and data communication.

The mobile communication system further comprises control signal communication means being provided in the mobile station, the base station control apparatus and the ISDN terminal respectively for requesting transition of communication mode from speech communication to simultaneous speech and data communication during speech communication between the mobile station and the ISDN terminal, under which a radio control channel and an ISDN D channel being used for transferring control signals between the mobile station and the base station control apparatus, and between the ISDN terminal and the base station control apparatus, respectively.

The mobile communication system further comprises signal path control means being provided in the base station control apparatus for controlling a signal path of speech signal to be connected to the full rate speech coding unit of the base station control apparatus when only speech communication being performed, and for controlling a signal path of speech signal to be connected to the half rate speech coding unit of the base station control apparatus when simultaneous speech and data communication being performed, wherein, data signal path being connected without any processing.

A method of communication mode transition, according to the present invention, during speech communication in a mobile communication system having a Time Division Multiple Access (TDMA) radio interface between mobile stations and a base station being coupled to a base station control apparatus, which is connected to an ISDN switching unit coupling a plurality of ISDN terminals, comprises the following steps:

(1) transmitting a first request signal from the mobile station to the base station-control apparatus through a radio control channel for requesting communication mode change during speech communication between the mobile station and the ISDN terminal;

(2) preparing change of bit rate for speech signal coding from full rate to half rate in the base station control apparatus;

(3) repeating the first request signal for requesting communication mode change from the base station control apparatus to the ISDN terminal through an ISDN D channel;

(4) transmitting a response signal through the ISDN D channel from the ISDN terminal to the base station control apparatus when the ISDN terminal having acknowledged the first request signal;

(5) repeating the response signal having acknowledged the first request signal by the ISDN terminal from the base station control apparatus to the mobile station through the radio control channel;

(6) transmitting a second request signal from the mobile station to the base station control apparatus through the radio control channel for requesting commencement of communication mode change operation;

(7) changing a speech signal coding operation from full rate coding to half rate coding in the base station control apparatus; and (8) allocating each of TDMA frames to a speech signal being coded with half bit rate and a data signal having the same bit rate as the speech signal alternatively.

A method of communication mode transition, according to the present invention, during speech communication in a mobile communication system having a Time Division Multiple Access (TDMA) radio interface between mobile stations and a base station being coupled to a base station control apparatus, which is connected to an ISDN switching unit coupling a plurality of ISDN terminals, comprises the following steps:

(1) transmitting a first request signal from the ISDN terminal to the base station control apparatus through an ISDN D channel for requesting communication mode change during speech communication between the mobile station and the ISDN terminal;

(2) preparing change of bit rate for speech signal coding from full rate to half rate in the base station control apparatus;

(3) repeating the first request signal for requesting communication mode change from the base station control apparatus to the mobile station through a radio control channel;

(4) transmitting a response signal through the radio control channel from the mobile station to the base station control apparatus when the mobile station having acknowledged the first request signal;

(5) repeating the response signal having acknowledged the first request signal by the mobile station from the base station control apparatus to the ISDN terminal through the ISDN D channel;

(6) transmitting a second request signal from the ISDN terminal to the base station control apparatus through the ISDN D channel for requesting commencement of communication mode change operation;

(7) repeating the second request signal for requesting commencement of communication mode change from the base station control apparatus to the mobile station through a radio control channel;

(8) changing a speech signal coding operation from full rate coding to half rate coding in the base station control apparatus and the mobile station; and (9) allocating each of TDMA frames to a speech signal being coded with half bit rate and a data signal having the same bit rate as the speech signal alternatively.

BRIEF DESCRIPTION OF THE DRAWINGS

FIGS. 1(a),(b) and (c) are bit formats for conventional technology of a simultaneous transmission system of the speech signal and the data signal.

DETAILED DESCRIPTION OF THE PREFERRED EMBODIMENTS

The present invention will be described in the following by referring to the attached drawings.

Figure 2:
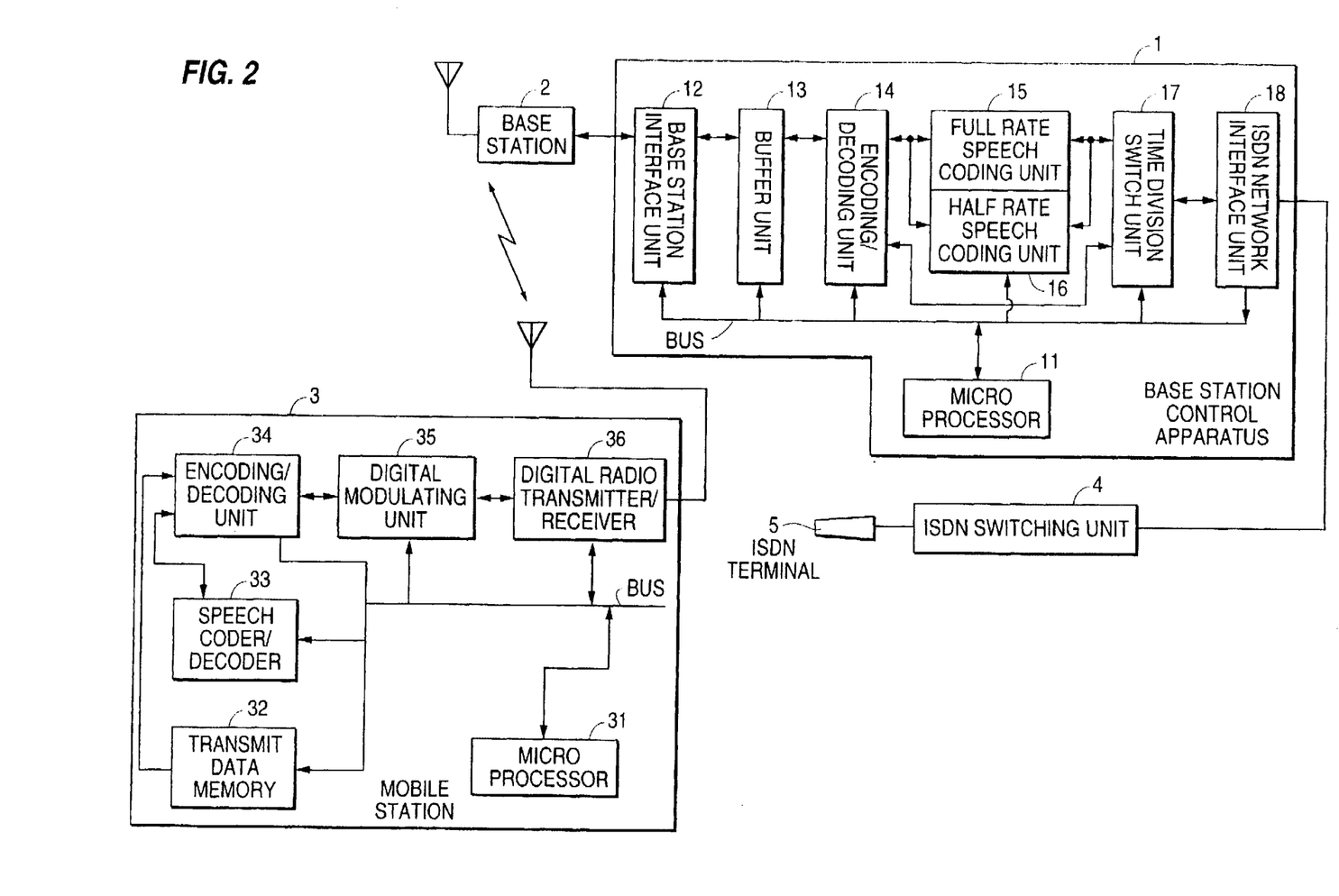
FIG. 2 is a block diagram for indicating an embodiment of the present invention.

FIG. 2 is a schematic block diagram for indicating an embodiment of the present invention.

In FIG. 2, a mobile communication system according to this embodiment is arranged by a mobile station 3 capable of transmitting/receiving a speech (voice) signal and a data signal, a base station 2 for transmitting/receiving a radio signal to/from the mobile station 3, a base station control apparatus 1 for transmitting /receiving a signal between the base station 2 and an ISDN switching unit 4, and an ISDN terminal 5 connected with the ISDN switching unit 4.

The base station control apparatus 1 is constructed of a base station interface unit 12 for interfacing this base station control apparatus 1 with the base station 2, a buffer unit 13 for performing a timing control of a signal transfer operation in the case that a signal speed between the base station 2 and the base station control apparatus 1 is different from another signal speed between the ISDN switching unit 4 and the base station control apparatus 1, an encoding (encrypting)/decoding circuit unit 14 for preventing signal wiretapping in the radio section, and a full rate speech coding unit 15 for converting speech signal of 32 kbps into speech signal of 64 kbps and vice versa. This base station control apparatus 1 is further arranged by a half rate speech coding unit 16 for converting speech signal of 16 kbps into speech signal of 64 kbps and vice versa, a time division switch unit 17 for connecting a communication path inside of the base station control apparatus 1, and an ISDN network interface unit 18 for interfacing the ISDN switching unit 4 with this base station control apparatus 1, and a microprocessor 11 for controlling the entire base station control apparatus 1.

Also, the mobile station 3 is constituted by a digital radio transmitter/receiver 36 for performing radio signal transmission/reception with the base station 2, a digital modulator 35, an encoding/decoding circuit 34, a speech CODER/DECODER 33, a transmit data memory 32, and a microprocessor 31 for controlling the entire mobile station 3.

Figure 3:
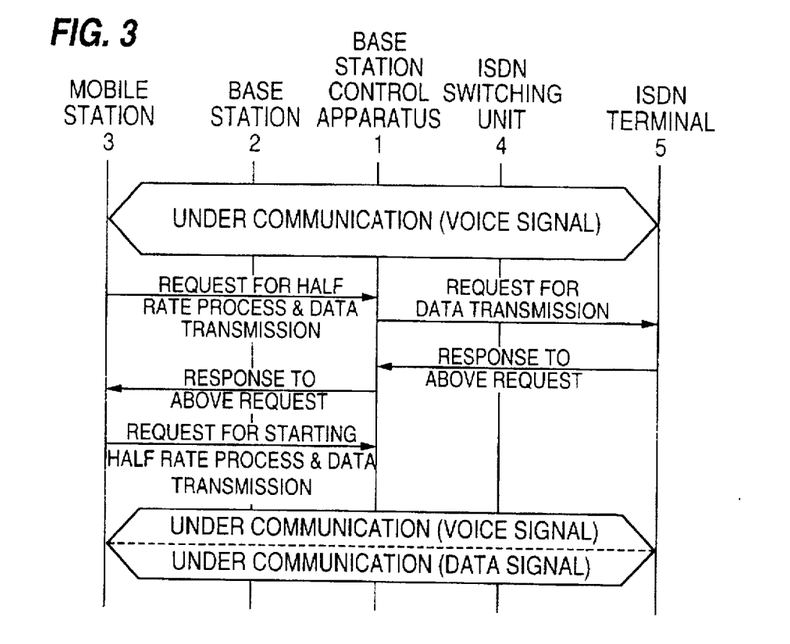
FIG. 3 is a diagram for representing a signal flow about a simultaneous communication of a speech signal and a data signal, while a mobile station has the initiative.

FIG. 3 is a diagram for representing a signal flow in this embodiment.

In FIG. 3, there is shown such a case that a telephone communication between the mobile station 3 and the ISDN terminal 5 is transferred to a simultaneous communication by a speech signal and a data signal, while the mobile station 3 has the initiative.

Figure 4:
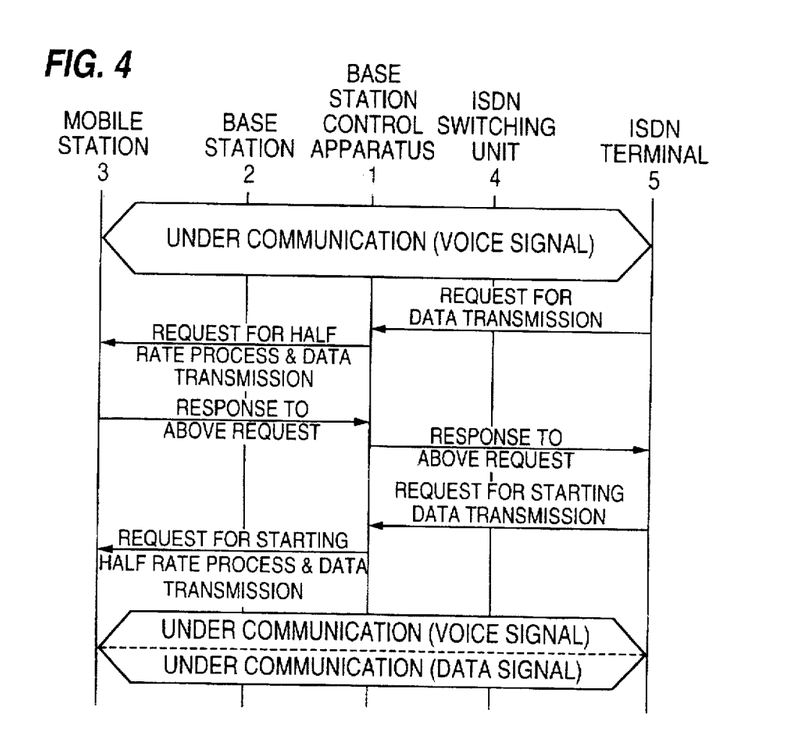
FIG. 4 is a diagram for representing a signal flow about a simultaneous communication of a speech signal and a data signal, while an ISDN terminal has the initiative.
Figure 5:
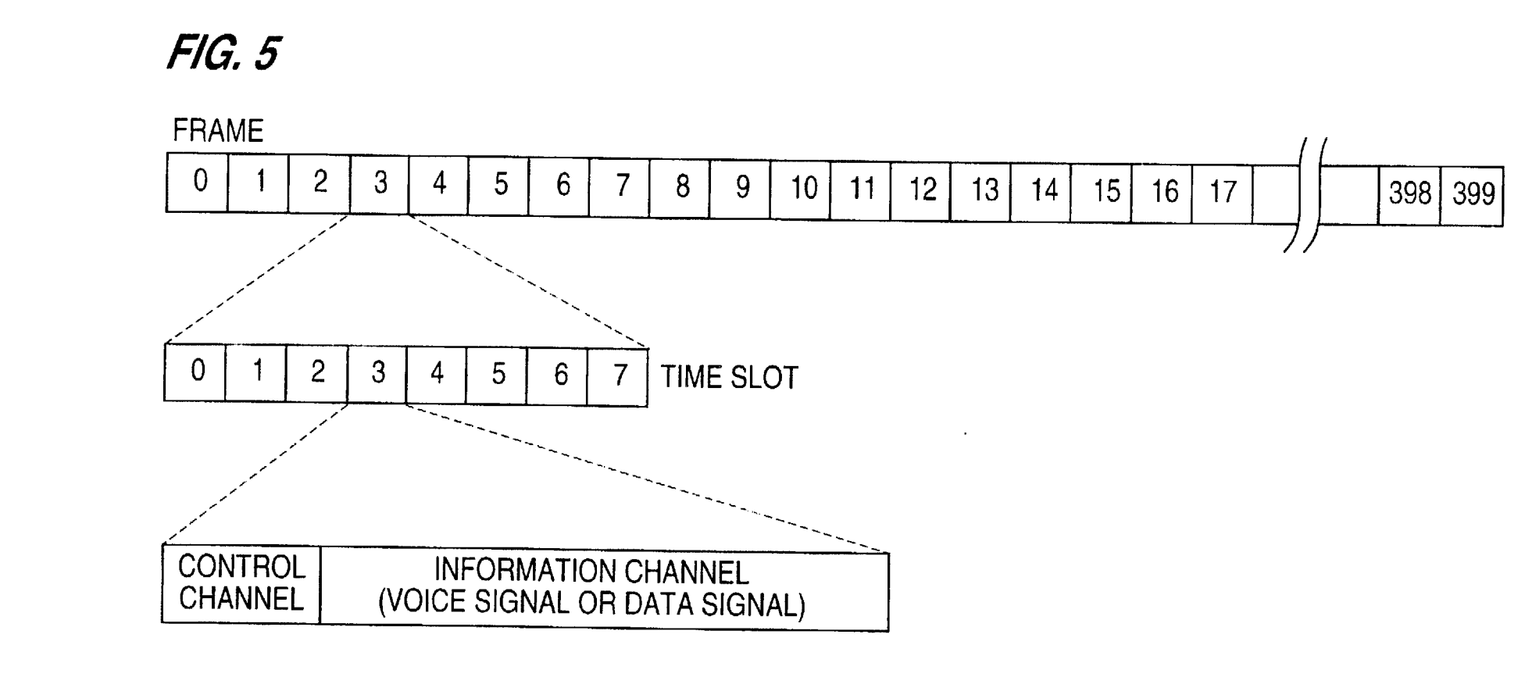
FIG. 5 is a diagram for showing a frame structure of the signal between the mobile station and a base station control apparatus in this embodiment.
Figure 6:
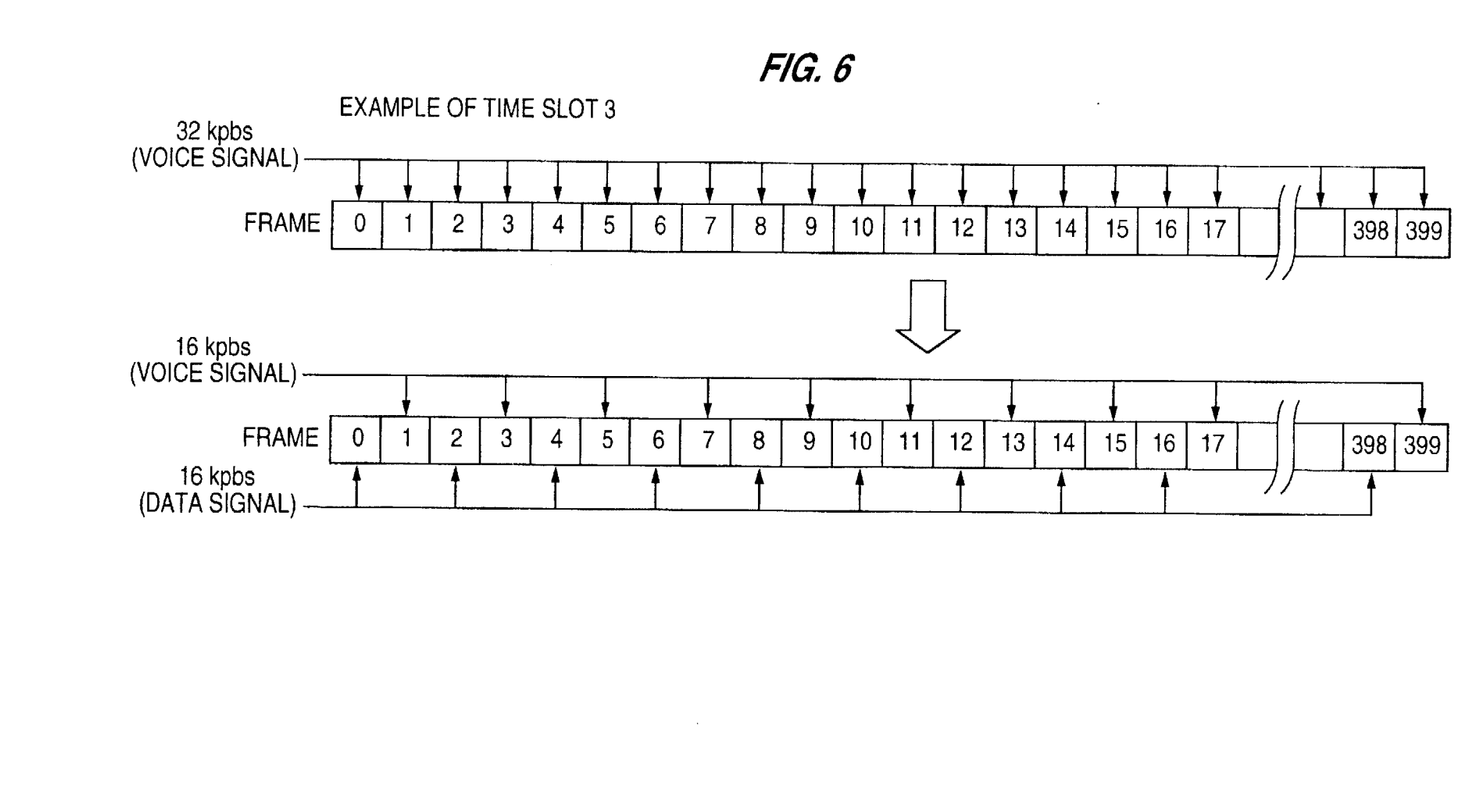
FIG. 6 illustrates a frame using method of the speech signal and the data signal in this embodiment.

FIG. 4 is a diagram for representing a signal flow of a simultaneous communication with a speech signal and a data signal, according to this embodiment, while the ISDN terminal has the initiative. FIG. 5 indicates a structure of a frame of signal transferred between the mobile station and the base station control apparatus in this embodiment. FIG. 6 represents a frame using method of a speech signal and a data signal in accordance with this embodiment.

Next, a description will now be made of operations according to this embodiment.

First, an explanation will now be made of operations when the telephone communication is transferred to the simultaneous communication of the speech signal and the data signal, while the mobile station has the initiative, with reference to FIGS. 2, 3, 5 and 6.

In this case, it is assumed that the mobile station 3 establishes a telephone communication with the ISDN terminal 5 via the base station 2, the base station control apparatus 1, and the ISDN switching unit 4. At the beginning, in the case that a user of the mobile station 3 requires a data transmission during this telephone communication, such a request signal, which indicates a request for the half rate process of speech signal and data transmission, is delivered from the mobile station 3 via the base station 2 to the base station control apparatus 1 by using a ratio control channel.

At the base station control apparatus 1, the request for the half rate process of speech signal and data transmission issued from the mobile station 3 is sent out as a data transmission request signal via the ISDN switching unit 4 to the ISDN terminal 5 by using the D channel of the ISDN user-network interface which is provided for data transmission apart form two B channels, and the base station control apparatus 1 prepares an operation of the half rate process of speech signal.

Upon receipt of the data transmission request signal, the ISDN terminal 5 checks situations of the ISDN terminal 5. If this ISDN terminal 5 is such a terminal capable of transmitting/receiving the speech and the data, then the ISDN terminal 5 may send a response signal via the ISDN switching unit 4 to the base station control apparatus 1 by using the D channel.

Upon receipt of the response signal to the data transmission request signal, the base station control apparatus 1 transmits a response signal via the base station 2 to the mobile station 3 by using a control channel with respect to the request for the half rate process of speech signal and data transmission.

When the mobile station 3 has received the response to the request and has confirmed availability of the data transmission at the ISDN terminal, this mobile station 3 then transmits next request signal to commence the operation for previous request, the half rate process of the speech signal and the data transmission, via the base station 2 to the base station control apparatus 1 by using the radio control channel, and then starts the data transmission simultaneously with the speech signal after sending this radio control channel in a timing of predetermined frames having elapsed.

A frame structure in this case will now be described with reference to FIGS. 5 and 6.

As shown in FIG. 5, the frame structure of the radio channel of signal transferred between the mobile station 3 and the base station 2 is constructed of a multi-frame structure of 400 frames. 1 frame is arranged by 8 time slots, and 1 time slot is arranged by a control channel and a information channel which contains either speech signal or data signal. While the mobile station 3 establishes the telephone communication (voice communication), each frame is allocated for the speech signal of 32 Kbps, as illustrated in an upper portion of FIG. 6. When the simultaneous communication of the speech signal and the data signal is commenced, each frame is allocated for the half rate processed speech signal of 16 kbps and the data signal of 16 kbps alternately as indicated in a lower portion of FIG. 6.

When the base station control apparatus 1 receives the request, for starting the half rate process of the speech signal and starting the data transmission, from the mobile station 3 via the base station 2 through the radio control channel, the base station control apparatus 1 performs the speech signal coding operation by the half-rate processed speed after a timing of predetermined speech frames having elapsed from this control channel. Then, the base station control apparatus 1 transmits the speech signal through the ISDN switching unit 4 to the ISDN terminal 5. As to the data frame, the base station control apparatus 1 transmits this data via the ISDN switching unit 4 to the ISDN terminal 5 by using an ISDN D channel without any data process. As to the speech signal derived from the ISDN terminal 5, the speech coding process is executed, the speech signal processed by the half rate is transmitted to the mobile station 3. As to the data signal derived from the ISDN terminal 5 using the ISDN D channel, this data signal is transmitted without any process to thereby commence the simultaneous transmission/reception of the speech signal and the data signal.

FIG. 4 is a diagram for showing a signal flow according to an embodiment of the present invention, and represents such an operation when the telephone communication established between the ISDN terminal 5 and the mobile station 3 is transferred to the simultaneous communication of the speech signal and the data signal, while the ISDN terminal 5 has the initiative.

Next, an explanation will now be made of operations when the telephone communication is transferred to the simultaneous communication of the speech signal and the data signal, while the ISDN terminal has the initiative, with reference to FIGS. 2, 4, 5 and 6.

In this case, it is assumed that the mobile station 3 establishes a telephone communication with the ISDN terminal 5 via the base station 2, the base station control apparatus 1 and the ISDN switching unit 4.

At the beginning, in the case that a user of the ISDN terminal 5 requests the data transmission during this telephone communication, such a request is delivered from the ISDN terminal 5 through the ISDN switching unit 4 to the base station control apparatus 1 by using an ISDN D channel. The base station control apparatus 1 receives the request signal for the data transmission issues from the ISDN terminal 5, and then sends the request signal of requesting the half rate process of the speech signal and the data transmission via the base station 2 to the mobile station 3 by using the radio control channel.

When the mobile station 3 receives the request signal of request for the half rate process of speech signal and the data transmission, this mobile station 3 checks situations of the mobile station 3. If this mobile station 3 is such a terminal station of transmitting/receiving the speech and the data, then the mobile station 3 may send a response signal via the base station 2 to the base station control apparatus 1 by using a control channel with respect to the request signal.

Upon receipt of the response signal, the base station control apparatus 1 transmits the response signal via the ISDN switching unit 4 to the ISDN terminal 5 by using the D channel with respect to the request for data transmission.

When the ISDN terminal 5 receives the response signal from the base station control apparatus 1, this ISDN terminal 5 transmits the next request signal for requesting to start the data transmission operation via the ISDN switching unit 4 to the base station control apparatus 1 by using the D channel, and then starts the simultaneous transmitting/receiving operation in such a manner that the speech signal is transmitted/received via the B channel, and the data signal is transmitted/received in the D channel after a timing of predetermined frames having elapsed from this request signal being sent.

When the base station control apparatus 1 receives the request for starting the data transmission operation from the ISDN terminal 5 via the ISDN switching unit 4, this base station control apparatus 1 requests the mobile station 3 through the radio control channel to commence the speech half-rate process operation and also the data transmitting operation. The base station control apparatus 1 starts processing of half rate process operation after a timing of predetermined frames having elapsed from receiving the request signal from the ISDN terminal. The data received from the ISDN terminal 5 via the D channel is transmitted without any data process to the mobile station 3, whereas both the speech processed by the half rate and the received data are transmitted to the mobile station 3 with such frame structures as shown in FIGS. 5 and 6, as previously explained when the speech signal and the data signal are simultaneously transmitted/received, while the mobile station 3 has the initiative.

When the mobile station 3 receives the request signal for starting the speech process by the half rate and the data transmission operation sent from the base station control apparatus 1, the mobile station 3 commences the speech half-rate process and the data transmission operation after a timing of predetermined frames having elapsed from this request signal.

As previously described, in accordance with the present invention, when the radio interface of the mobile station and the base station interface are the time division multiplexing access system, while the telephone communication is established between the mobile station and the base station control apparatus, the speech signal is communicated in the full rate. In such a case that both the speech signal communication and the data signal communication are requested during the telephone communication, the respective frames on the radio interface and the base station interface are alternately allocated to the speech signal communication and the data signal communication. In the transmission frames, the frame for allocated to the speech signal at the half rate (16 Kbps) and the frame for allocated to the data signal having the same bit number (16 Kbps) as the half rate are transmitted alternatively.

As a result, present invention has a capable of providing the mobile communication system in which the speech signal and the data signal can be simultaneously transmitted without interrupting the call even after the mobile station has been entered into the telephone communication state.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A mobile communication system having a Time Division Multiple Access (TDMA) radio interface between mobile stations and a base station being coupled to a base station control apparatus, which is connected to an ISDN switching unit coupling a plurality of ISDN terminals, the mobile communication system comprising:

a full rate speech coding unit being provided in the mobile station and the base station control apparatus respectively for coding speech signal with full bit rate as being used for ordinary communication speed;

a half rate speech coding unit being provided in the mobile station and the base station control apparatus respectively for coding speech signal with half bit rate as being used for ordinary communication speed; and frame allocating control means being provided in the mobile station and the base station control apparatus respectively for allocating all TDMA frames to speech signal being coded with full bit rate when communication between the mobile station and the ISDN terminal being speech communication only, and for allocating each of TDMA frames to a speech signal being coded with half bit rate and a data signal having the same bit rate as the speech signal alternatively when communication between the mobile station and the ISDN terminal being simultaneous speech communication and data communication.

2. A mobile communication system according to claim 1, further comprising:

control signal communication means being provided in the mobile station, the base station control apparatus and the ISDN terminal respectively for requesting transition of communication mode from speech communication to simultaneous speech and data communication during speech communication between the mobile station and the ISDN terminal, under which a radio control channel and an ISDN D channel being used for transferring control signals between the mobile station and the base station control apparatus, and between the ISDN terminal and the base station control apparatus, respectively.

3. A mobile communication system according to claim 2, further comprising:

signal path control means being provided in the base station control apparatus for controlling a signal path of speech signal to be connected to the full rate speech coding unit of the base station control apparatus when only speech communication being performed, and for controlling a signal path of speech signal to be connected to the half rate speech coding unit of the base station control apparatus when simultaneous speech and data communication being performed;

wherein, data signal path being connected without any processing.

4. A method of communication mode transition during speech communication in a mobile communication system having a Time Division Multiple Access (TDMA) radio interface between mobile stations and a base station being coupled to a base station control apparatus, which is connected to an ISDN switching unit coupling a plurality of ISDN terminals, the method comprising steps of:

transmitting a first request signal from the mobile station to the base station control apparatus through a radio control channel for requesting communication mode change during speech communication between the mobile station and the ISDN terminal;

preparing change of bit rate for speech signal coding from full rate to half rate in the base station control apparatus;

repeating the first request signal for requesting communication mode change from the base station control apparatus to the ISDN terminal through an ISDN D channel;

transmitting a response signal through the ISDN D channel from the ISDN terminal to the base station control apparatus when the ISDN terminal having acknowledged the first request signal;

repeating the response signal having acknowledged the first request signal by the ISDN terminal from the base station control apparatus to the mobile station through the radio control channel;

transmitting a second request signal from the mobile station to the base station control apparatus through the radio control channel for requesting commencement of communication mode change operation;

changing a speech signal coding operation from full rate coding to half rate coding in the base station control apparatus; and allocating each of TDMA frames to a speech signal being coded with half bit rate and a data signal having the same bit rate as the speech signal alternatively.

5. A method of communication mode transition during speech communication in a mobile communication system having a Time Division Multiple Access (TDMA) radio interface between mobile stations and a base station being coupled to a base station control apparatus, which is connected to an ISDN switching unit coupling a plurality of ISDN terminals, the method comprising steps of:

transmitting a first request signal from the ISDN terminal to the base station control apparatus through an ISDN D channel for requesting communication mode change during speech communication between the mobile station and the ISDN terminal;

preparing change of bit rate for speech signal coding from full rate to half rate in the base station control apparatus;

repeating the first request signal for requesting communication mode change from the base station control apparatus to the mobile station through a radio control channel;

transmitting a response signal through the radio control channel from the mobile station to the base station control apparatus when the mobile station having acknowledged the first request signal;

repeating the response signal having acknowledged the first request signal by the mobile station from the base station control apparatus to the ISDN terminal through the ISDN D channel;

transmitting a second request signal from the ISDN terminal to the base station control apparatus through the ISDN D channel for requesting commencement of communication mode change operation;

repeating the second request signal for requesting commencement of communication mode change from the base station control apparatus to the mobile station through a radio control channel;

changing a speech signal coding operation from full rate coding to half rate coding in the base station control apparatus and the mobile station; and allocating each of TDMA frames to a speech signal being coded with half bit rate and a data signal having the same bit rate as the speech signal alternatively.

* * * * *